United States Patent [19]
Callahan

[11] 3,929,859
[45] Dec. 30, 1975

[54] MANUFACTURE OF DINITRILES FROM THIODINITRILES

[75] Inventor: James L. Callahan, Wooster, Ohio

[73] Assignee: The Standard Oil Company, Cleveland, Ohio

[22] Filed: Nov. 18, 1974

[21] Appl. No.: 524,729

[52] U.S. Cl.... 260/465.8 R; 260/465 H; 260/465.1; 260/465.9
[51] Int. Cl.² ................. C07C 120/00; C07C 121/20; C07C 121/26; C07C 121/64
[58] Field of Search .................. 260/465.8 R, 465 H

[56] References Cited
UNITED STATES PATENTS

| | | |
|---|---|---|
| 3,185,743 | 5/1965 | LaCombe et al. ........... 260/465.9 X |
| 3,424,784 | 1/1969 | Barsky ......................... 260/465.8 R |

Primary Examiner—Joseph P. Brust
Attorney, Agent, or Firm—Herbert D. Knudsen

[57] ABSTRACT

The invention is the extrusion of sulfur from thiodinitriles to obtain the corresponding dinitrile by heating the thiodinitrile at a temperature of 200° to 700°C. For example, sulfur is extruded from thiodipropionitrile to obtain adiponitrile. This extrusion reaction can be either a strictly thermal reaction employing no other reactant or a reaction conducted in the presence of other gases, liquids or solids.

15 Claims, No Drawings

MANUFACTURE OF DINITRILES FROM THIODINITRILES

BACKGROUND OF THE INVENTION

The liquid phase extrusion of sulfur from thiodipropionitrile is shown in U.S. Pat. No. 3,424,784. The temperature shown in this reference is 175°C., which is substantially below the minimum of 200°C., claimed by the present invention.

SUMMARY OF THE INVENTION

The present invention is a process for producing a dinitrile of the formula

NC—R—R'—CN from a thiodinitrile of the formula

NC—R''—S—R'''—CN wherein R, R', R'' and R''' are aliphatic or aromatic hydrocarbon radicals; and wherein R and R'' have the same number of carbon atoms and R' and R''' have the same number of carbon atoms comprising heating the thiodinitrile at a temperature of 200° to 700°C. Employing the present invention gives high yields of the desired dinitrile. Of special interest in the invention is the production of adiponitrile from thiodipropionitrile. Thiodipropionitrile shall hereinafter be referred to as TDPN.

The central feature of the present invention is the fact that sulfur can be thermally extruded from thiodinitriles of the formula shown above. Extrusion of the sulfur from these compounds leaves the corresponding dinitrile.

The most important feature of the invention is the reaction temperature. Broadly as noted above, the reaction temperature may range from about 200° to about 700°C. Within the broad temperature range, temperatures between 300° and 650°C. have been shown to give the most desirable results, with temperatures in the range of 400° to 600°C. being especially useful to give reactions that have especially high commercial potential.

Within the temperature ranges claimed, the reaction of the present invention can be conducted in the vapor or liquid phase. Of special interest in the present invention are reactions conducted in the vapor phase. These reactions have been shown to be especially desirable for the production of the dinitrile. Of course, to obtain a liquid phase reaction within the higher temperature ranges of the invention, pressure must be applied. It is anticipated that a reactor pressurized with hydrogen and/or acrylonitrile would give the most desirable results.

Although the thermal extrusion of the thiodinitrile is the central feature of the invention, of greater desirability because of the high yields involved is the conduct of the extrusion in the presence of a solid. Of special interest is the use of a solid that is a metal or metal containing material.

Among the metals that may be employed in the reaction, those selected from the group consisting of elements of Group IIIA, IVA, VA, VIA, IB, IIB, VB, VIB, VIIB or VIII are preferred. Of these numerous metals, it has been found that iron, nickel, manganese, copper, silver and tin are of greatest interest with the use of iron or copper being of greatest significance because of the especially desirable yields obtained using these solids.

These metals may be used alone or in alloys or mixtures.

The reaction conditions other than the temperature limitation are not critical. However, there are certain preferred aspects of the reaction to give most desirable results.

In the vapor phase reactions, it has been found that the use of an additional gas in the reactant feed is desirable to purge the products through the reactor. When a heterogeneous solid is employed, this purge gas is also believed to draw the products off the surface of the solid and into the effluent from which the dinitrile is recovered. Essentially any gas may be employed in the reaction. Representative examples of these purge gases include nitrogen, air, acrylonitrile, carbon monoxide, carbon dioxide, argon, hydrogen and the like. Of special interest as far as the purge gases are concerned is the use of hydrogen, acrylonitrile or mixture thereof. These gases appear to not only act as a purge gas but also act as promoters of the reaction of thiodipropionitrile to give desirably high yields.

The pressure employed in the reaction may vary widely. Subatmospheric, superatmospheric or atmospheric pressure may be employed. The contact time may range from less than a second to a number of hours depending on the reaction temperature and state of reaction.

The reactor employed in the invention can be an open tube with an inlet for reactants and an outlet for products. In the preferred practice of the invention, this open tube could be at least partially filled with a solid as described in the Specific Embodiments. The reactor could take the form of either a fixed-bed reactor with a solid fixed in the reaction zone or a fluid-bed reactor. Although a fixed-bed reactor has been employed in all of the experiments of the Specific Embodiments, it is anticipated that a fluid-bed reactor could be employed to great advantage in the present invention.

When a heterogeneous solid is employed, there is a tendency for the heterogeneous solid to become sulfided during the course of the reaction. This sulfiding is especially noticeable when a metal is employed. As the catalyst becomes sulfided, it tends to lose activity for the desired reaction. Even though some catalysts are enhanced by partial sulfiding, there is a point of sulfiding at which regeneration appears to be desirable. Normally, the regeneration involves at least partial return of the sulfided metal to the metallic state or a lower valence state. This can be suitably accomplished by the action of hydrogen or another reducing agent on the catalyst or in a more convenient method, the catalyst may be oxidized with air and then reduced with a reducing agent. Using either technique, the catalytic activity of the heterogeneous solid has been observed to be restored.

The recovery and purification of the dinitrile product is normally very convenient. The reactor effluent contains unreacted thiodinitrile, the dinitrile product and mononitriles of the formula HRCN formed by breaking the sulfur out of the thiodinitrile without joining the carbon atoms and these combustion gases. The thiodinitrile, dinitrile and mononitrile are then sequentially and selectively condensed from the reactor effluent according to the disparity in their boiling points. The thiodinitrile is conveniently recycled to the reactor, the dinitrile is purified and the mononitrile can be reacted with $H_2S$ to form the thiodinitrile starting material. The purification of the dinitrile usually consists mainly of hydrogenating ethylinic unsaturation found in the final product if the saturated product is desired.

Special mention of the reaction of TDPN to form adiponitrile is warranted in view of the extreme commercial importance of this reaction. Adiponitrile, as is well known, is an important intermediate in the production of nylon. It appears that the present invention provides a dramatic improvement in the method of making adiponitrile. The TDPN employed as the starting material can be easily prepared from hydrogen sulfide and acrylonitrile. Furthermore, in the reaction of TDPN, one of the major by-products is acrylonitrile that could be conveniently recycled for reaction with hydrogen sulfide to produce more of the TDPN. As noted above, this reaction is the central focus of the present invention, even though other dinitriles can be conveniently prepared by the process of the invention.

SPECIFIC EMBODIMENTS

EXAMPLE 1 — Thermal Extrusion of Sulfur from Thiodipropionitrile

A reactor was constructed of a 8.0 mm. inside diameter stainless steel tube. The reactor has a 10 cc. reaction zone, an inlet for reactants and an outlet for products. The reactor was heated in a salt bath to give the desired reaction temperature.

The thermal extrusion of sulfur from TDPN was conducted at a temperature of 505°C. using a reactant feed of 0.06 cc. per minute of TDPN measured as a liquid and a nitrogen purge of 8 cc. per minute measured as a gas at a standard temperature and pressure. The products were collected in chloroform and analyzed by gas liquid chromotography. The nature of the products was confirmed by mass spectrostophy. For purposes of reporting the yield, adiponitrile includes amounts of unsaturated dinitriles produced such as 1,4-dicyanobutene-2. The amounts of these by-products were less than 20% in all experiments. The remaining by-products were propionitrile and acrylonitrile. In this experiment, 16.4% of the TDPN fed was converted to products and of the TDPN converted, 7.0% was adiponitrile. For purposes of this application, the following definitions are used:

$$\% \text{ conversion} = \frac{\text{moles of a TDPN reacted} \times 100}{\text{moles of TDPN fed}}$$

$$\% \text{ yield} = \frac{\text{moles of adiponitrile formed} \times 100}{\text{moles of TDPN reacted}}$$

EXAMPLES 2–9 — Use of Solids

In the reactor described above, various solids other than iron and copper were used to convert TDPN to adiponitrile. The solids for these reactions were prepared as follows:

EXAMPLE 2

Aluminum — The reaction zone was charged with 10 cc. of ⅛ × ⅛ inch aluminum tablets that were obtained from compression of aluminum metal powder in a compression mold.

EXAMPLE 3

Active carbon — The reaction zone was filled with 10 cc. of 10–20 mesh Witco active carbon sold as Grade 118.

EXAMPLE 4

Silica gel — The reactor was filled with 10 cc. of 10–20 mesh silica prepared by drying Nalco 1040A silica sol at 125°C. and calcining the resulting product in air for 1 hour at 350°C.

EXAMPLE 5

Molybdenum — The reactor was filled with 10 cc. of solid prepared as follows: 54 g. of molybdenum metal powder was mixed with 20 g. of 34% silica sol to form a uniform mixture. The resulting mixture was dried and reduced in a flow of hydrogen for one hour at 540°C.

EXAMPLE 6

Cobalt — The reactor was filled with 10 cc. of solid prepared as follows: 80 g. of $Co_3O_4$ and 23 g. of 34% silica sol were thoroughly mixed to form a uniform mixture. The resulting mixture was dried in air and reduced with hydrogen for 2 hours at 540°C.

EXAMPLE 7

Vanadium — The reaction zone was filled with 6 cc. of coarse vanadium turnings measuring approximately ⅛ × 1/16 inch.

EXAMPLE 8

Silicon carbide — The reaction zone was filled with approximately 7 cc. of 9–40 mesh crushed silicon carbide pellets sold under the tradename Norton BC-132.

EXAMPLE 9

Nickel — The reactor was filled with 10 cc. of 10–20 mesh nickel catalyst prepared by mixing 173 g. of nickel powder and 35 g. of 34% silica sol. The solid was pretreated with TDPN for 18 minutes at 450°C., prior to the reaction.

The catalyst above were used to convert TDPN to adiponitrile under the conditions and using the feeds shown in Table 1.

Table 1

Use of Solids Other than Iron and Copper in the Production of Adiponitrile

| Example | Solid | Temp°C. | Feed, cc/min. TDPN | Feed, cc/min. AN* | Gas/Flow | Results, % Conversion | Results, % Yield |
|---|---|---|---|---|---|---|---|
| 2 | Aluminum | 540 | 0.45 | — | $N_2$/2 | 63.5 | 3.2 |
| 3 | Active Carbon | 480 | 0.06 | — | $N_2$/8 | 100 | <1.0 |
| 4 | Silica Gel | 505 | 0.06 | — | $N_2$/8 | 100 | <1.0 |
| 5 | Molybdenum | 540 | 0.01 | 0.05 | $N_2$/8 | 95.5 | 4.4 |
| 6 | Cobalt | 540 | 0.01 | 0.06 | $N_2$/8 | 100 | <1.0 |
| 7 | Vanadium | 540 | 0.02 | 0.009 | $N_2$/8 | 58.9 | 5.9 |
| 8 | Silicon Carbide | 535 | 0.02 | — | $H_2$/5 | 46.9 | 13.7 |

Table 1-continued

Use of Solids Other than Iron and Copper in the Production of Adiponitrile

| Example | Solid | Temp°C. | TDPN | AN* | Gas/Flow | Results, % Conversion | Yield |
|---|---|---|---|---|---|---|---|
| 9 | Nickel | 510 | 0.038 | — | $N_2$/6 | 100 | 8.1 |

*AN = Acrylonitrile

EXAMPLES 10-28 — Use of Various Forms of Copper

Copper in various forms was tested in the reactor shown above. Each example represents a run of 8.5 minutes using a 0.024 cc. per minute flow of TDPN and 0.094 cc. per minute flow of acrylonitrile, both measured as a liquid, and a gaseous flow of hydrogen at a rate of 5 cc. per minute unless otherwise noted. The various catalysts employed and any treatment of the catalyst during the reaction is discussed below.

EXAMPLES 10-13

Cu on SiC — Silicon carbide was placed in a solution of copper chloride. To this mixture, hydrazine was added to reduce the copper and deposit the copper on the silicon carbide. The reactor was charged with 5 cc. of the catalyst, and the catalyst was reduced in a stream of hydrogen for 1 hour at 540°C. After Example 10, the reactor was purged with hydrogen for 30 minutes. After Example 11, air was passed through the reactor for 30 minutes at 540°C. followed by a hydrogen reduction at 540°C. for 25 minutes. After Example 12, there was an air regeneration and a hydrogen reduction, each of which lasted for 15 minutes at 540°C.

EXAMPLES 14-15

Etched Cu wool — Etched Cu wool was prepared by etching coarse Cu wool with a solution of nitric acid; 6 cc. of the catalyst was charged to the reactor. After Experiment 14, the reactor was flushed with hydrogen at reaction temperature for four hours.

EXAMPLES 16-18

Fine Cu wool — The reactor was charged with 2 cc. of extra fine Cu wool prepared by etching coarse Cu wool with nitric acid and reducing the Cu wool for 1 hour at 540°C. with hydrogen. There was no treatment of the copper after Examples 16 or 17.

EXAMPLES 19-22

Bonded Cu flake — The reactor was charged with 1 cc. of fine copper wool and 6 cc. of bonded Cu metal flake pigment made by mixing fine copper powder with glycerol to form a thick paste, drying this metal overnight at 125°C., calcining it at 500°C. for 15 minutes in air, grinding the dried mixture to 9-40 mesh and reducing the flake at 545°C. for one hour with hydrogen. After Example 19, the reactor was purged with hydrogen for 40 minutes. After Experiment 20, the reactor was purged with hydrogen for 40 minutes. After Experiment 20, the reactor was purged with hydrogen for 1.5 hours. After Experiment 21, the reactor was purged with hydrogen for 0.75 hours.

EXAMPLES 23-28

Reduced CuO wire — The reactor was charged with 5 cc. of Mallinkrodt "wire form" copper oxide which had been reduced overnight in a hydrogen stream at 540°C. After Example 23, the reactor was purged with hydrogen for 20 minutes. After Examples 24 and 25, the reactor was purged with hydrogen for 30 minutes. After Example 26, the catalyst was regenerated in air at 540°C. and reduced with hydrogen for one hour. After Example 27, the reactor was purged with hydrogen for 20 minutes.

The results obtained using these forms of copper are summarized in Table 2.

Table 2

Use of Different Forms of Copper for the Production of Adiponitrile from TDPN

| Example | Solid | Temp°C. | Results, % Conversion | Yield |
|---|---|---|---|---|
| 10 | Cu on SiC | 540 | 84.8 | 53.0 |
| 11 | ″ | 550 | 69.6 | 63.3 |
| 12 | ″ | 540 | 87.9 | 52.0 |
| 13 | ″ | ″ | 100 | 42.2 |
| 14 | Etched Cu wool | 535 | 62.1 | 55.1 |
| 15 | ″ | 545 | 60.7 | 80.0 |
| 16 | Fine Cu wool | 550 | 69.6 | 60.8 |
| 17 | ″* | ″ | 65.2 | 79.6 |
| 18 | ″ | 570 | 72.8 | 69.6 |
| 19 | Bonded Cu flake | 545 | 92.4 | 60.0 |
| 20 | ″ | 540 | 66.5 | 71.3 |
| 21 | ″* | ″ | 60.7 | 82.9 |
| 22 | ″** | 555 | 62.1 | 91.6 |
| 23 | Reduced CuO wire | 540 | 87.9 | 42.8 |
| 24 | ″ | ″ | 72.8 | 69.0 |
| 25 | ″ | ″ | 69.6 | 72.5 |
| 26 | ″ | 560 | 75.9 | 58.0 |
| 27 | ″ | 550 | 72.8 | 51.6 |
| 28 | ″ | ″ | 68.3 | 64.4 |

*$H_2$ flow 3 cc./min.
**$H_2$ flow 4 cc./min.

EXAMPLES 29-40 — Cu Catalysts and Modified Cu Catalysts

In the same manner shown in the examples above, various copper catalysts and modified copper catalysts were employed. The feed contained nitrogen as the purge gas, rather than hydrogen as in the examples above. The results using these various catalysts are shown in Table 3. The catalysts were prepared as follows:

EXAMPLE 29

Cu shot — The reactor was filled with Cu shot measuring 2-3 mm. in diameter.

EXAMPLE 30

Silver plated Cu shot — Approximately 10 cc. of Cu shot was treated with a dilute solution of silver nitrate to deposit a small amount of silver metal on the shot.

EXAMPLE 31

Silver Cu alloy — The reactor was charged with 7 cc. of a copper-silver alloy shot having a ⅛ inch diameter. This copper-silver shot is commonly known as coil silver.

EXAMPLE 32

Tin coated Cu shot — The reactor was charged with 10 cc. of approximately 1/32 inch diameter tin coated copper particles. The tin coated copper particles were supplied by Laboratory Equipment Company as part 501-263.

EXAMPLES 33-36

Cu turnings — The reactor was charged with 10 cc. of light Cu turnings that were well packed into the reaction zone. In Example 34, fresh copper turnings were again charged to the reactor. In Example 35, fine Cu turnings were charged to the reactor and reduced with hydrogen for one hour at 540°C. In Example 36, the catalyst was used in the condition found after Example 35.

EXAMPLE 37

Zinc plated Cu turnings — The reactor was charged with 7 cc. of fine Cu turnings which were electroplated with a very thin layer of zinc from a zinc sulfate solution using a zinc anode and dry cell batteries for current.

EXAMPLE 38

Manganese plated Cu turnings — The reactor was charged with 7 cc. of fine Cu turnings which were electroplated with a solution containing manganese chloride and ammonium chloride.

EXAMPLE 39

Cu turnings — Hg addition — The reactor was charged with 7 cc. fine copper turnings and 0.35 cc. of Hg added to the feed in approximately 20 equal increments during the 17-minute run.

EXAMPLE 40

Cu turnings — chloroform addition — The reactor was charged with 7 cc. of fine copper turnings and to the feed was added a flow of 0.0015 cc. per minute of chloroform measured as a liquid.

The results of these experiments are shown in Table 3.

catalyst which had been reduced in hydrogen for four hours at 540°C. Subsequent to each of the runs, there was a flow of hydrogen over the catalyst for 20 minutes at reaction temperature. Subsequent to Example 44, there was an oxidation in air overnight and reduction with hydrogen for a period of 1 hour. Subsequent to Example 48, the catalyst was oxidized in air for one hour and then reduced with hydrogen for 1 hour. The results of these experiments are shown in Table 4. The reaction temperature in each case was 540°C. except where noted.

Table 4

Continuous Run Using Catalyst of Copper on Silicon Carbide

| Example | Results, % Conversion | Yield |
|---|---|---|
| 41 | 100 | 42.2 |
| 42 | 86.2 | 53.0 |
| 43 | 60.7 | 61.9 |
| 44 | 42.4 | 42.5 |
| 45* | 86.2 | 41.6 |
| 56 | 87.9 | 55.3 |
| 47 | 60.7 | 56.2 |
| 48 | 86.2 | 45.0 |
| 49 | 77.2 | 52.6 |

*535°C.

EXAMPLES 50-61 — Use of Cu Metal on Silicon Dioxide

Various catalysts of Cu metal powder on silicon dioxide were prepared. These catalysts were used in the conversion of TDPN to adiponitrile under the conditions noted in Table 5. The catalysts for these reactions were prepared as follows:

EXAMPLES 50-54

The catalyst was prepared by mixing Cu powder with a 34% silica sol to form a uniform mixture. The mixture was dried at 540°C. in air for one hour and reduced with hydrogen for 2 hours at 510°C. Examples 51 and 52 employed fresh catalyst prepared as described above. Example 53 was run using the catalyst of Example 52 after reduction at 540°C. for 1 hour with hydrogen. Example 54 employed a catalyst prepared above sintered at 1 hour at 1000°C. and reduced in hydrogen Table 3

Copper Catalysts and Variations of the Copper Catalysts

| Example | Solid | Length of Run, Min. | Temp °C. | Feed cc/min. TDPN | AN | N$_2$ | Conversion | Yield |
|---|---|---|---|---|---|---|---|---|
| 29 | Copper shot | 30 | 530 | 0.02 | — | 4 | 51 | 16.6 |
| 30 | Silver plated copper shot | 18 | 505 | 0.056 | — | 8 | 78.2 | 4.6 |
| 31 | Silver copper alloy | 8.5 | 540 | 0.024 | 0.094 | 5 | 39.3 | 46.3 |
| 32 | Tin coated copper | 18 | 495 | 0.056 | — | 7 | 67.3 | 6.2 |
| 33 | Cu turnings | 29 | 525 | 0.015 | 0.061 | 5 | 69.4 | 28.3 |
| 34 | " | 13 | 543 | " | 0.062 | 4 | 72.8 | 59.5 |
| 35 | " | 26 | 546 | " | " | 3 | 88.4 | 51.5 |
| 36 | " | 26 | 550 | " | " | 5 | 82.6 | 54.0 |
| 37 | Zn plated Cu turnings | 17 | 535 | 0.024 | 0.094 | " | 100 | 33.9 |
| 38 | Mn plated Cu turnings | 16 | 540 | 0.025 | 0.100 | " | 89.3 | 27.9 |
| 39 | Cu turnings, Hg addition | 17 | 535 | 0.024 | 0.094 | " | 52 | 60.5 |
| 40 | Cu turnings, CHCl$_3$ addition | 17 | 540 | 0.015 | 0.060 | 6 | 38.6 | 34.6 |

EXAMPLES 41-49 — Continuous run using Cu on silicon carbide

A number of 8.5 minute runs using a feed of 0.024 cc. per minute of TDPN and 0.094 cc. per minute of acrylonitrile measured as a liquid and 5 cc. per minute of hydrogen were run using a catalyst of Cu on silicon carbide. The reactor was charged with 7 cc. of the at 540°C. This catalyst was then pretreated by feeding 0.2 cc. TDPN and 0.8 cc. of acrylonitrile in a hydrogen stream at 540°C. over the catalyst in 5 minutes.

EXAMPLE 55

The reactor was filled with a first layer of 2 cc. of 1/8 inch Cu shot, a second layer of 3 cc. of the catalyst prepared in Example 50 above and a third layer of 5 cc.

Cu shot. This catalyst mixture was reduced in hydrogen for 1 hour at 540°C.

EXAMPLES 56–57

The reactor was charged with 10 cc. of 10–20 mesh catalyst prepared by grinding 207 g. of Cu oxide to a fine powder and combining this powder with 41 g. of Nalco silica sol. The mixture was mixed into a paste and dried at 120°C. overnight. The dried solid was then heated in air for 2 hours at 1000°C. and then ground and screened to a 20–30 mesh fraction. The resulting solid was calculated to contain 92.2% copper metal with the remainder being silicon dioxide. This catalyst was reduced for 1.5 hours at 525°C. During the course of the reaction, dimethyl sulfide was added to the feed. The catalyst from Experiment 56 was reduced with hydrogen at 530°C. for 30 minutes and used in Example 57.

EXAMPLES 58–61

The catalyst prepared for Example 56 was promoted with various elements to form the catalyst employed in these examples. For the catalyst containing platinum, 5 cc. of the Cu catalyst prepared in Example 56 was impregnated with 1.9 g. of a 10% solution of platinum chloride. To prepare the catalyst containing potassium, 5 cc. of the catalyst of Example 56 was impregnated with 0.095 g. of potassium hydroxide dissolved in a small volume of water. To prepare the catalyst containing phosphorus, 5 cc. of the catalyst used in Example 56 was impregnated with 0.16 g. of 85% phosphoric acid. To prepare the catalyst containing bismuth, 5 cc. of the catalyst employed in Example 56 was impregnated with 1.54 g. of $Bi(No_3)_3.5H_2O$ dissolved in nitric acid. In each preparation the resulting material was dried and heat treated at 500°C. for 1 hour.

The results of the experiments using these catalysts and conditions is shown in Table 5.

EXAMPLES 62–76 — Use of iron catalysts.

Various iron catalysts were prepared and tested. The catalyst preparations and reactions are described below. The results of these experiments are shown in Table 6.

EXAMPLES 62–66

A catalyst of 93% iron powder and 7% silica were prepared by mixing iron powder and silica sol, drying the mixture, calcining the dried product and reducing the calcined product with hydrogen. In Examples 62, 63 and 64, fresh catalyst was employed. In Example 65, the catalyst was sintered in air at 1000°C. and reduced in hydrogen at 525°C. for one hour. Example 66 used the catalyst in the same manner as Example 65 except that the reduction took place at 540°C.

EXAMPLES 67–70

The reactor was charged with 1 cc. of fine steel wool at the bottom and 6 cc. of bonded iron metal made by mixing fine electrolytic iron powder with glycerol to form a thick paste, drying the resulting paste at 180°C. for 2 hours, heating the dried material in a covered container at 500°C. for 30 minutes and grinding and screening the solid to a 9–40 mesh material. This catalyst was reduced with a hydrogen stream in the reactor for 2 hours at 540°C. After the experiment of Example 67, the reactor was purged with hydrogen for 1 hour at 540°C. and the resulting catalyst was used in Example 68. The reaction was continued in Examples 69 and 70.

EXAMPLES 71–76

The reactor was charged with 10 cc. of iron chips measuring approximately ⅛ inch in diameter. In Examples 72 and 73, the reaction with the charge of Example 71 was continued. In Example 74, the catalyst used in Example 73 was employed and hydrogen was used as Table 5

| | | Copper Metal Powder on Silicon Dioxide and Variations Thereof in the Preparation of Adiponitrile | | | | | | |
|---|---|---|---|---|---|---|---|---|
| | | | Run Time | | Feed, cc/min. | | Results, % | |
| Example | Solid | Temp °C. | Min. | TDPN | AN | Gas/Flow | Conversion | Yield |
| 50 | 90% Cu powder 10% $SiO_2$ | 405 | 17 | 0.059 | — | $N_2/8$ | 100 | 8.7 |
| 51 | " | 510 | 61 | 0.013 | 0.052 | $N_2/7$ | 100 | 22.4 |
| 52 | " | 455 | 65 | " | " | " | 97.7 | 10.8 |
| 53 | " | 545 | 55 | 0.015 | 0.058 | $H_2/5$ | 100 | 30.1 |
| 54 | " | 540 | 8.5 | 0.024 | 0.094 | $H_2/20$ | 100 | 17.8 |
| 55 | Cu shot/$CuSiO_2$ | 545 | 18 | 0.056 | — | $N_2/5$ | 95.8 | 17.9 |
| 56 | $CuSiO_2$ + 0.15 dimethyl sulfide | 520 | 18 | 0.222 | — | " | 100 | 13.1 |
| 57 | $CuSiO_2$ | 540 | 43 | 0.019 | 0.074 | " | 100 | 34.0 |
| 58 | $CuSiO_2$ + Pt | 525 | 9 | 0.011 | 0.044 | $N_2/4$ | 100 | 29.1 |
| 59 | $CuSiO_2$ + K | 540 | 13 | 0.015 | 0.062 | $N_2/7$ | 100 | 19.1 |
| 60 | $CuSiO_2$ + P | 525 | 13 | " | " | $N_2/5$ | 83.5 | 36.8 |
| 61 | $CuSiO_2$ + Bi | 525 | 13 | " | " | " | 100 | 22.7 | the purge gas. In Example 75, fresh iron catalyst was employed in the presence of hydrogen. In Example 76, the reactor was charged with fresh iron particles.

Table 6

| | | Use of Various Iron Catalysts in the Production of Adiponitrile | | | | | | |
|---|---|---|---|---|---|---|---|---|
| | | Run Time | | | Feed, cc/min. | | Results, % | |
| Example | Catalyst | Min. | Temp°C. | TDPN | AN | Gas/Flow | Conversion | Yield |
| 62 | 93% Fe powder 7% $SiO_2$ | 34 | 505 | 0.029 | — | $N_2/3.5$ | 100 | 4.9 |
| 63 | " | 17 | 540 | 0.059 | — | $N_2/14$ | 100 | 5.9 |
| 64 | " | 18 | 400 | 0.056 | — | $N_2/8$ | 100 | 4.3 |
| 65 | " | 18 | 520 | 0.056 | — | $N_2/8$ | " | 6.6 |
| 66 | " | 33 | 540 | 0.024 | 0.094 | $H_2/20$ | " | 13.0 |
| 67 | Powdered Fe | 8.5 | 540 | 0.024 | 0.094 | $H_2/5$ | " | 17.9 |
| 68 | " | " | " | " | " | " | " | 27.7 |

Table 6-continued

Use of Various Iron Catalysts in the Production of Adiponitrile

| Example | Catalyst | Run Time Min. | Temp°C. | TDPN | Feed, cc/min. AN | Gas/Flow | Results, % Conversion | Yield |
|---|---|---|---|---|---|---|---|---|
| 69 | " | " | " | " | " | H$_2$/3 | " | 34.1 |
| 70 | " | " | 525 | " | " | " | " | 38.7 |
| 71 | Fe chips 1/8" | 17 | 510 | 0.058 | — | N$_2$/3.5 | " | 8.5 |
| 72 | " | 16 | 530 | 0.062 | — | " | 88.6 | 11.5 |
| 73 | " | 37 | 540 | 0.058 | — | N$_2$/2.5 | 89.2 | 7.0 |
| 74 | " | 30 | 525 | " | — | H$_2$/3.5 | 100 | 10.4 |
| 75 | " | 34 | 570 | " | — | H$_2$/20 | 100 | 7.3 |
| 76 | " | 45 | 510 | 0.012 | 0.046 | N$_2$/6 | 93.3 | 29.4 |

EXAMPLES 77–93 — Use of Various Steel Wool Catalysts.

Various steel wool catalysts were prepared and tested under the conditions described below. The results of these tests are summarized in Table 7.

EXAMPLES 77–78

Fine steel wool was reduced in a stream of hydrogen for 15 minutes at a temperature of 530°C. The catalyst of Example 78 employed the catalyst of Example 77 that had been purged with nitrogen after the running of Example 77.

EXAMPLES 79–80

The reactor was charged with 7 cc. of very fine steel wool and reduced in hydrogen for 30 minutes at 540°C. After Example 79, the reactor was purged with hydrogen.

EXAMPLE 81

The reactor was charged with 7 cc. of fine steel wool. The steel wool was washed with acetone and dried in air. The steel wool was immersed in dilute ammonia solution of copper chloride and a few drops of hydrazine solution were added in an attempt to deposit a small amount of zero valent copper on the steel wool. The product was dried in air and heated at 535°C. in hydrogen for 30 minutes.

EXAMPLE 82

Cu was electroplated on steel wool from copper sulfate solution using a 1.5 volt battery.

EXAMPLE 83

The reactor was charged with 8 cc. of steel wool, and during the course of the reaction, 0.001 cc. per minute of chloroform, measured as a liquid, was added.

EXAMPLES 84–87

The reactor was charged with 7 cc. of fine steel wool and different purge gases were employed.

EXAMPLES 88–89

Fresh steel wool was employed.

EXAMPLES 90–91

Approximately 10 cc. of course steel wool was charged to the reactor in Example 90. In Example 91, 7 cc. of fine steel which had been etched with a dilute solution of sulfuric acid was employed.

EXAMPLE 92

The reactor was charged with 7 cc. of fine steel wool which was electroplated with a very thin layer of zinc from a zinc sulfate solution and a zinc anode, and dry cell batteries were used for electrical current.

EXAMPLE 93

The reactor was charged with 7 cc. of fine steel wool and 0.35 cc. of Hg was added in 20 equal increments during the course of the reaction. In the same manner as shown above, TDPN was passed over these catalysts under the conditions shown in Table 7.

Table 7

Use of Steel Wool Catalysts And Variations Thereof

| Example | Solid | Temp°C. | Feed, cc/min. TDPN | AN | Gas/Flow | Results, % Conversion | Yield |
|---|---|---|---|---|---|---|---|
| 77 | Steel wool | 525 | 0.015 | 0.062 | N$_2$/6 | 100 | 39.1 |
| 78 | Steel wool | 540 | 0.057 | 0.023 | N$_2$/7 | 93.3 | 54.3 |
| 79 | Steel wool | 540 | 0.016 | 0.640 | " | 94.2 | 58.5 |
| 80 | Steel wool | 540 | 0.200 | 0.400 | H$_2$/7 | 88.4 | 53.4 |
| 81 | Cu treated steel wool | 535 | 0.160 | 0.640 | N$_2$/5 | 70.1 | 54.8 |
| 82 | Cu plated steel wool | 540 | 0.025 | 0.100 | N$_2$/7 | 85.0 | 45.9 |
| 83 | Steel wool, chloroform addition | 535 | 0.011 | 0.038 | N$_2$/7 | 89.0 | 50.1 |
| 84 | Steel wool | 535 | 0.015 | 0.062 | CO/7 | 95.1 | 44.8 |
| 85 | Steel wool | 535 | 0.133 | 0.533 | CO/10 | 84.2 | 46.4 |
| 86 | Steel wool | 535 | 0.057 | 0.023 | air/7 | 91.7 | 42.6 |
| 87 | Steel wool | 540 | 0.050 | 0.200 | air/9 | 94.2 | 12.3 |
| 88 | Steel wool | 570 | 0.145 | 0.582 | N$_2$/6 | 87.5 | 52.0 |
| 89 | Steel wool | 570 | 0.020 | 0.080 | N$_2$/5 | 95.8 | 43.5 |
| 90 | Coarse steel wool | 540 | 0.015 | 0.062 | " | 87.5 | 49.7 |
| 91 | Acid etched fine steel wool | 540 | 0.057 | 0.229 | N$_2$/5 | 92.6 | 55.6 |
| 92 | Zn plated steel wool | 535 | 0.024 | 0.094 | " | 100 | 10.7 |
| 93 | Steel wool, Hg addition | " | " | " | " | 98.4 | 46.2 |

EXAMPLES 94–97 — The Affect of Additives.

Various compounds were added to the feed gas using a catalyst of iron particles described above. The results using these additives are shown in Table 8.

Table 8

Effect of Various Additives to the Extrusion Reaction Using a Catalyst of Iron Particles

| Example | Additive, cc/min. | Temp°C. | Feed, cc/min. TDPN | Gas/Flow | Results, % Conversion | Yield |
|---|---|---|---|---|---|---|
| 94 | 0.08 acrylonitrile | 505 | 0.02 | N₂ | 83.7 | 26.1 |
| 95 | 0.056 water | 500 | 0.056 | " | 100* | 5.3 |
| 96 | 0.056 benzene | 500 | 0.056 | " | 100* | 8.1 |
| 97 | 0.048 propionitrile | 505 | 0.012 | " | 98.4 | 6.1 |

*assumed

EXAMPLES 98–105 — Production of adiponitrile from TDPN using a 50—50 mixture of copper and iron powder.

A catalyst consisting of a 50—50 mixture of Cu metal powder and iron metal powder was employed. After Example 98, the reactor was run under hydrogen at 515°C. overnight in a flow of hydrogen. After Examples 99, 100 and 104, a 20-minute flow of hydrogen was employed. After Examples 101 and 103, a hydrogen purge was employed for 30 minutes. After Example 102, a hydrogen purge for 2 hours was employed. The results of these experiments are shown in Table 9. The feed rate of the reactants was 0.024 cc.

Table 9

Production of Adiponitrile from TDPN Using a 50–50 Mixture of Copper and Iron Powder

| Example | Temp°C. | Results, % Conversion | Yield |
|---|---|---|---|
| 98 | 540 | 100 | 27.7 |
| 99 | " | " | 30.6 |
| 100 | " | " | 35.8 |
| 101 | " | " | 35.8 |
| 102 | " | " | 34.1 |
| 103 | 480 | 86.2 | 35.6 |
| 104 | 565 | 87.9 | 33.6 |
| 105 | " | 81.7 | 47.5 |

In the same manner as described above for the reaction of thiodipropionitrile, other thiodinitriles can be reacted. For example, NCCH₂SCH₂CN can be reacted to form NCCH₂CH₂CN, NCCH₂CH₂CH₂CH₂SCH₂CH₂CH₂CN can be reacted to NC—CH₂—CH₂—CH₂—CH₂—CH₂—CH₂—CH₂—CN and NCCH₂SCH₂CH₂CN can be reacted to form NCCH₂CH₂CH₂CN.

I claim:

1. A process for producing a dinitrile of the formula
NC—R—R'—CN
from a thiodinitrile of the formula

NC—R''—S—R'''—CN wherein:
R, R', R'' and R''' are aliphatic or aromatic hydrocarbon radicals; and
R and R'' have the same number of carbon atoms and R' and R''' have the same number of carbon atoms comprising heating the thiodinitrile at a temperature of 200° to 700°C.

2. The process of claim 1 wherein the temperature of reaction is 300°–650°C.
3. The process of claim 1 wherein the temperature is 400°–600°C.
4. The process of claim 1 conducted in the vapor phase.
5. The process of claim 1 wherein the reaction of the thiodinitrile is conducted in the presence of a solid.
6. The process of claim 5 wherein the solid contains a metal or mixture thereof.
7. The process of claim 6 wherein the metal or metals are selected from the Groups IIIA, IVA, VA, VIA, IB, IIB, VB, VIB, VIIB or VIII.
8. The process of claim 6 wherein the metal or metals are selected from iron, nickel, manganese, copper, silver and tin.
9. The process of claim 6 wherein the metal is iron.
10. The process of claim 6 wherein the metal is copper.
11. The process of claim 1 wherein the reaction is conducted in the presence of acrylonitrile, hydrogen or mixture thereof.
12. The process of claim 1 wherein thiodipropionitrile is reacted to produce adiponitrile.
13. The process of claim 12 wherein the reaction is conducted in the presence of acrylonitrile.
14. The process of claim 12 wherein the adiponitrile is recovered.
15. The process of claim 12 wherein the unreacted thiodipropionitrile is recycled to the reaction.

* * * * *